Patented Apr. 10, 1934

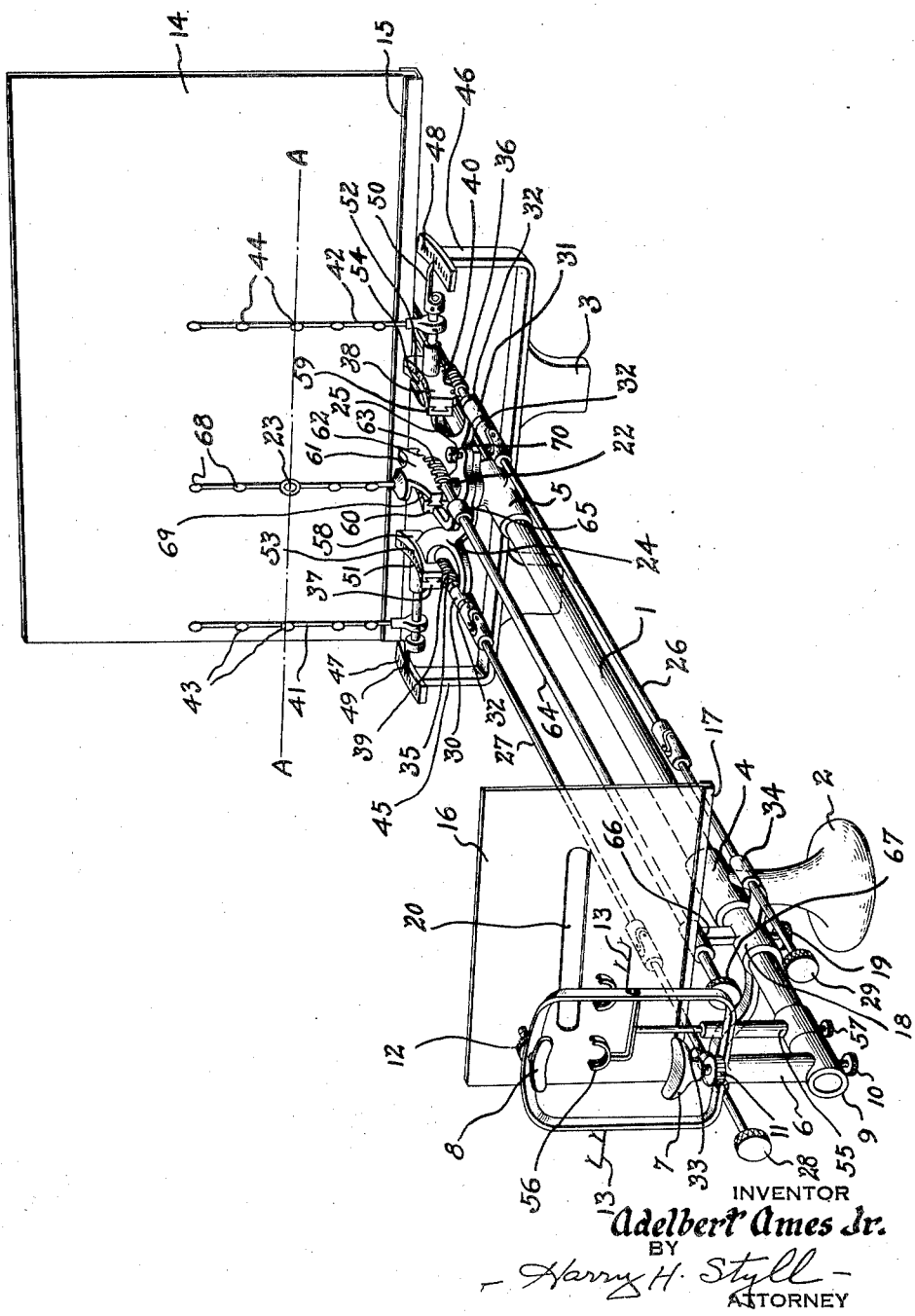

1,954,399

UNITED STATES PATENT OFFICE 1,954,399

EYE TESTING INSTRUMENT AND METHOD

Adelbert Ames, Jr., Hanover, N. H., assignor to trustees of Dartmouth College, Hanover, N. H., a corporation of New Hampshire Application July 9, 1932, Serial No. 621,618

24 Claims. (Cl. 88—20)

This invention relates to improvements in eye testing, and more particularly has reference to methods and means of determining the nature and extent of certain defects of human eyes, and of determining the necessary correction therefor.

As discussed in the copending applications of Adelbert Ames, Jr. and Gordon H. Gliddon, Serial Nos. 385.610 and 385,611, both filed on August 13, 1929, and in various scientific publications (as for example in the "Transactions of the Section on Ophthalmology of the American Medical Association" 1928), the relative size and shape of the ocular images of the eyes of a person may vary and thereby cause discomfort or more serious trouble. It was found that the presence of such image size and/or shape differences (herein also referred to as size defect), which are most likely due to peculiarities in the correlation of specific cortical centers and corresponding points on the retina of each eye, influence the horopter of the person having the differences, and that by observing the horopter deviations it is possible to evaluate this ocular defect quantitatively and qualitatively, for the purpose of scientific investigation as well as for prescribing corrective instrumentalities.

The horopter, which may be defined as the surface in space, every point on which is imaged on corresponding retinal points, is substantially symmetrical with respect to a vertical plane through the medial line of sight of a person having no size defects. If, however, the ocular images have different sizes, one and the same object appears smaller to that eye which produces a more extended ocular image. This causes in binocular vision an apparent change in shape, and especially also a rotation, of the longitudinal horopter, which may be described as the intersection of the horopter surface and fans of projection lines from the mean nodal points of the eyes, the fans being confined in a plane through these nodal points. This rotation of the longitudinal horopter appears to take place about a vertical axis passing through the point of fixation at which the eyes are looking, the horopter portion at the side of the eye with the larger ocular image appearing more distant. Hence, the determination of the position of the longitudinal horopter is a means for determining the binocular judgment of depth of the patient, and for determining the presence of size differences in the corresponding longitudinal meridians of the eyes in question. The size defect, if present, can then be evaluated and corrected by means of lenses which place the horopter in normal position, that is, a position corresponding to equal ocular images. From the amount of distortion of the horopter, it is also possible to calculate the difference in size of the images of the two eyes and to prescribe corrective lenses accordingly.

The present invention involves the above characterized method of determining size differences and an instrument for carrying out this method by determining the position in space of the surface upon which all objects visible to the eyes under test must be placed, in order to appear in a front parallel plane through the fixation point, the actual spatial positions of these objects corresponding to the horopter and forming the basis for the above referred to evaluation of ocular image size defects.

One object of this invention is therefore to provide a method and means of determining the size of the ocular image of one eye relative to that of the other.

Another object is to provide a method and means of determining the shape of the ocular image of one eye relative to that of the other.

Another object is to provide a method and means for determining the accuracy of the binocular judgment of depth of a patient throughout substantially his entire field of vision.

Another object is to provide a method and means for determining the positions in which a series of objects must be placed in order to appear to be in a plane normal to a line from the point of fixation to a point half way between the center of the eyes i. e. a medial line of sight.

One other object of this invention is to provide a method and means for determining the accuracy of the binocular judgment of depth of a patient for points in the peripheral portions of the field of vision.

Still another object of this invention is to provide a method of determining the corrections necessary to compensate for any errors of the eyes which may be determined by the above methods and means.

Another object is to provide, simple, efficient and inexpensive means for determining the horopter in a horizontal meridian and which will give the findings of the relative sizes and shapes of the ocular images in terms suitable for clinical use.

Other objects and advantages of this invention will become apparent from the following description taken in connection with the accompanying drawing, and it will be understood that many changes may be made in the arrangement and details of parts and in the order and steps of the processes described without departing from the spirit of this invention as set forth in the accompanying claims. I, therefore, do not wish to be limited to the exact details shown and described, the preferred forms only having been shown by way of illustration.

Referring to the drawing:

The figure is a diagrammatic perspective view illustrating one embodiment of the invention.

The apparatus to be described involves, generally speaking, a fixation object and several test objects grouped peripherally and preferably in several meridians, a main meridian substantially in a horizontal plane through the nodal points of the eyes, and meridians above and below the main meridian in the peripheral regions of the field of vision. In order to cause these test objects to appear situated in a front parallel plane, they can be moved measurable amounts about a vertical axis through the fixation point, corresponding to a rotation of the horopter about the axis, and they can also be moved about a horizontal axis through the fixation object, since the horopter displacements may be different in different meridians.

As illustrated in the drawing, the various elements of the instrument are mounted on a support such as the rod or shaft 1 which is carried by the pedestals 2 and 3. In this instance the pedestals are provided at their upper ends with sleeve portions 4 and 5 through which the rod 1 is adapted to pass.

Adjacent one end of the rod 1 there is mounted a member 6 carrying an adjustable chin rest 7 and an adjustable forehead rest 8, adapted to support the head of the patient in a fixed position. The member 6 is supported on the rod 1 by a sleeve portion 9 adapted to slide on the rod 1, and may be secured in any desired position of adjustment by means such as the set screw 10. The chin rest 7 is mounted on the member 6 by means such as the adjusting screw 11 so that it may be adjusted for height. The forehead rest 8 is mounted on the member 6 by means such as a hoop so that the field of view of the patient is not interfered with and is adjustable relative to the hoop by means of a thumb wheel 12.

The head rest is provided with suitable corneal aligning sights 13 by means of which the eyes of the patient may be placed in accurate relation relative to the test means of the instrument.

Adjacent the opposite end of the rod 1 there is mounted the back screen 14 which has the purpose of obscuring from view objects other than the test objects. This screen is mounted in a holding means 15 which is in turn mounted on the rod 1.

At a point near the head rests and between the head rests and the screen 14 there is mounted a second screen 16 in a holding means 17 which is secured to the sleeve 18. The sleeve 18 is slidable on the rod 1 and may be secured in a desired position on the rod by means such as the set screw 19. The screen 16 is provided with an opening 20 therein so as to afford a view of a large part of the screen 14 therethrough by a person whose head is in the head rests. The screen 16 is adapted to shut out from the field of view all objects not falling within the field defined by the screen 14.

The sleeve 5 between the screens 14 and 16 carries an upright shaft member 22 on which is mounted a fixation object 23 in such a position that it will be visible through the opening 20 in the screen 16.

Adjacent the bottom of the shaft member 22 two laterally extending members 24 and 25 are separately pivoted on the shaft member 22 to swing about it as a center. The members 24 and 25 may be swung about the shaft member 22 by means of the flexible shafts 26 and 27 having knobs 28 and 29 respectively on one end and passing through the brackets 30 and 31 respectively adjacent their opposite ends. The brackets 30 and 31 are rigidly secured to the laterally extending members 24 and 25 respectively, and collars 32 are secured on the flexible shafts 26 and 27 on both sides of the brackets 30 and 31 respectively so that the shafts may revolve in the brackets, but may not slide through them. At the ends adjacent the knobs 28 and 29 the flexible shafts 26 and 27 are supported by the brackets 33 and 34 respectively, in which they are allowed to rotate and through which they may slide longitudinally. Adjacent the brackets 30 and 31 the shafts 26 and 27 are provided with worm gear threads 35 and 36 for a purpose which will become apparent from the following description.

On the outer end of the members 24 and 25 there is provided curved slideways 58 and 59 for the purpose of receiving the curved slides 37 and 38 respectively. These slides 37 and 38 are provided adjacent their respective lower edges with worm gear sectors 39 and 40 cooperating with the worm gear threads 35 and 36 respectively to rotate the slides 37 and 38 upon turning of the knobs 28 and 29.

Attached to the slides 37 and 38 there are upright rods 41 and 42 respectively carrying at spaced points thereon the target members 43 and 44. The rods 41 and 42 are made of substantially the same color as the screen 13 so that they will be practically invisible against the screen as a background. The target members 43 and 44 are of some contrasting color so that they will show up plainly.

From the above it will be seen that by pushing or pulling the knobs 28 and 29 longitudinally of the shafts 26 and 27 the target rods 41 and 42 will be rotated separately about the upright rod 22 as an axis. These rods 41 and 42 may also be separately rotated about a horizontal axis indicated by a line A—A passing through the fixation object 23 as the center of rotation, by rotating the knobs 28 and 29. A set screw 70 is provided to clamp the arms 24 and 25 together so that they may be moved as a unit about the pivot 22 if desired.

In order to measure the amounts of rotation of these rods 41 and 42, the arms or brackets 45 and 46 are mounted on the sleeve 5 and are provided with indicator scales 47 and 48 cooperating with the pointers 49 and 50 to indicate the amount of rotation in the horizontal plane. The slides 37 and 38 and slideways 58 and 59 also are provided with indicator scales 51 and 52 cooperating with pointers 53 and 54 to indicate the amount of rotation in the vertical plane.

The upright 22 is provided with a curved slideway 60 for the purpose of receiving the curved slide 61 on which the support for the fixation object 23 is mounted. The slide 61 is provided adjacent its lower edge with a worm gear sector 62 which cooperates with a worm gear 63 mounted on a shaft 64. The shaft 64 is provided with a knob 67 and is supported adjacent one end in a bearing 65 formed on the slideway 60 and adjacent its opposite end in a bearing 66 formed on the support for the screen 16. The shaft 64 is rotated by turning the knob 67 and in turn rotates the fixation object support and test object members 68 on said support about the horizontal axis A—A passing through the fixation object 23 as the center of rotation.

In order to measure the amount of rotation of the fixation object support and test objects the slide 61 and slideway 60 are provided with suitable scale and indicator means adjacent the upper edge 69 of the slideway.

For the purpose of receiving trial lenses to determine directly the correction necessary to compensate for any error found by this device, there is provided a bracket 55 carrying trial lens cells 56 in position before the normal position of a patient's eyes. This bracket 55 may be secured to the rod 1 by means such as the set screw 57.

If the ocular images of a patient's eyes are not of the same size and shape objects positioned in a frontal parallel plane will not appear in that plane, that is, if the ocular image of one eye is larger over all than that of the other the objects will appear as if rotated about a vertical axis through the point of fixation. If the image of the right eye is larger, the objects in the right field of view will appear farther away and objects in the left field will appear nearer and vice versa if the ocular image of the left eye is larger. This difference of size causes an apparent displacement of the position of objects in space as determined by binocular depth perception.

If the ocular image of one eye is progressively asymmetrically distorted in the horizontal meridian relative to that of the other eye it will cause objects placed in a frontal parallel plane to appear concave or convex depending upon whether the distortion is greater or smaller on the nasal side of the retina.

If the distortion is the same amount but opposite in both eyes the effect is doubled.

In the use of the instrument illustrated and described above, the patient places his head on the rests provided and locks through the aperture 20 in the screen 16, fixing upon the target or fixation object 23, care being taken that the eyes converge symmetrically on the fixation object 23, and that 23 is approximately in the horizontal plane through the nodal points of the eyes. He cannot see the rods 41 and 42 distinctly because their color blends with that of the screen 14, but the targets 43, 44 and 68 should be clearly apparent. The patient is then asked to look at the fixation object and to manipulate the knobs 28 and 29 until the targets 43, 44, and 68 and the fixation object 23 all appear to lie in the same plane perpendicular to his medial line of sight. During the test all factors, other than binocular vision, that might induce depth perception are effectively eliminated, due to the presence of screen 16 and the general arrangement of the device, as described.

The examiner may then determine from the positions of the respective targets, just what the errors in relative size and shape of the respective ocular images may be. For instance, if the targets 44 are placed farther from the eye than the targets 43, the examiner will know that the ocular image of the right eye is smaller than that of the left eye and from the amount of the deviations of the targets from the frontal parallel plane defined by pin 22 and axis A—A, he can determine the amount of size difference, for example, by plotting horopter curves, from which the actual size defects can be calculated.

Certain differences in the size and shape of the ocular images may make themselves apparent in the tipping of the frontal parallel plane about its horizontal axis corresponding to the displacement of the longitudinal horopters of the upper and lower meridians which deviations may or may not be symmetrical. In view of this the targets 43, 44 and 68 are arranged to be adjusted about this axis.

The amounts of these differences in distances to the various targets may be determined by reading the indications of the pointers 49, 50, 53 and 54, on the scales 47, 48, 51 and 52.

By the position in which the patient sets the targets it can be determined whether or not he has peripheral binocular depth perception and if it is abnormal in its general nature.

Although applicant only shows three sets of test objects 43, 44, and 68 it is to be understood that any desired amount may be used and that the said test means may be only in the form of rod members such as the supports for the test objects or any suitable means.

By placing trial size lenses of the type described and claimed in the above-mentioned copending application Serial No. 385,610 and/or prisms in the trial lens cells 56 and again asking the patient to set the targets, a correction may be found to give the patient substantially normal binocular depth perception the targets being then placed objectively as well as subjectively in the frontal parallel plane.

From the foregoing it will be apparent that I have provided simple and efficient means for carrying out all the objects of my invention. It will be understood however, that this is by way of illustration and example only and that the scope of this invention is to be limited only by the prior art and the scope of the appended claims.

Having described my invention I claim:—

1. In a device of the character described, the combination of means for fixing the eyes of the patient, means movable about said fixation means as a center for testing the said eyes and means in combination with said last named means for eliminating from the patient's vision all bases of depth judgment except that of binocular depth perception.

2. In a device of the character described, the combination of means for fixing the eyes of the patient, and a plurality of test members mounted for pivotal movement both horizontally and vertically about said fixation means as a center.

3. In a device of the character described, the combination of a movable support having means thereon for fixing the eyes of the patient, said support being movable about the fixation means as a center, and a plurality of test members mounted for separate pivotal movement both horizontally and vertically about the said fixation means as a center.

4. In a device of the character described, the combination of means for supporting the head of the patient, means aligned with said head support for fixing the eyes of the patient, a plurality of test members mounted for binocular observation on opposite sides of the fixation means and for pivotal movement about the fixation means as a center and means in cooperative relation with the head support and test members for eliminating from the patient's vision all bases of depth judgment except that of binocular depth perception.

5. In a device of the character described, the combination of means for fixing the eyes of the patient, means movable about said fixation means as a center for testing the said eyes, means mounted in cooperative relation with the test means for eliminating from the patient's vision all bases of depth judgment except that of binocular depth perception and means cooperating with the movable test means for determining the movement thereof.

6. In a device of the character described, the combination of means for fixing the eyes of the patient, a plurality of test members mounted for pivotal movement both horizontally and vertically about said fixation means as a center and means cooperating with the test members for determining the movement thereof.

7. In a device of the character described, the combination of a movable support having means thereon for fixing the eyes of the patient, said support being movable about the fixation means as a center, means cooperating with said fixation means for determining the movement thereof, a plurality of test members mounted for pivotal movement both horizontally and vertically about the said fixation means as a center and means cooperating with said test members for determining the movement thereof.

8. In a device of the character described, the combination of means for supporting the head of the patient in a fixed position, means adjacent the head support for supporting corrective means in the line of vision of each eye, means within the direct field of vision for fixing the eyes of the patient, and means on opposite sides of the fixation means for testing the eyes while fixed on the fixation means, said means being rotatable in a horizontal plane substantially about a vertical axis through the fixation means as the center of rotation and in a vertical plane substantially about a horizontal axis through the fixation means as the center of rotation, each of said rotative movements being independent of each other.

9. In a device of the character described, combination of the means for supporting the head of the patient in a fixed position, means within the direct field of vision for fixing the eyes of the patient, said means being rotatable substantially about the point of fixation as the center of rotation, and means on opposite sides of the fixation means for testing the eyes, said means being rotatable in a horizontal plane substantially about a vertical axis through the fixation means as the center of rotation and in a vertical plane substantially about a horizontal axis through the fixation means as the center of rotation, each of said rotative movements being independent of each other.

10. In a device of the character described, the combination of means for supporting the head of the patient in a fixed position, means within the direct field of vision for fixing the eyes of the patient, said means being rotatable substantially about the point of fixation as the center of rotation, means on opposite sides of the fixation means for testing the eyes, said means being rotatable in a horizontal plane substantially about a vertical axis through the fixation means as the center of rotation and in a vertical plane substantially about a horizontal axis through the fixation means as the center of rotation, each of said rotative movements being independent of each other and means cooperating with said fixation and test means for determining the positions thereof relative to a single plane normal to the patients medial line of sight.

11. The method of determining the differences in the size and shapes of the ocular images of the two eyes of a patient comprising fixing the patient's eyes on a central fixation object, presenting to the eyes test objects at various points distributed over the field of vision around said fixation object, adjusting said test objects toward and away from the patient until they appear to the eyes to be in a single plane normal to his principal line of sight, comparing the positions of the test objects with the positions they would occupy if placed in an actual plane normal to the patient's principal line of sight and from the comparative data evaluating said size and shape differences.

12. The method of determining the differences in the size and shapes of the ocular images of the two eyes of a patient comprising fixing the patient's eyes on a fixation object located substantially at the center of the field of vision, presenting to the eyes a plurality of targets at various points in the periphery of the field of vision substantially equal distances to the right and to the left of said fixation object, moving said targets toward and away from the eyes until they appear to the patient to lie in a single plane normal to his medial line of sight, and comparing the positions of corresponding right and left targets with the positions they would occupy if placed in an actual plane normal to the patient's principal line of sight.

13. The method of determining the differences in the relative size and shapes of the ocular images of the two eyes of a patient comprising fixing the patient's eyes on a fixation object located substantially at the center of the field of vision, presenting to the eyes a plurality of test members at various points in the center and in the periphery of the field of vision to the right and to the left and above and below the said fixation object, moving the test members both vertically and horizontally about the fixation object as a center until they appear to the patient to lie in a single plane normal to his principal line of sight and comparing the positions of the test objects with the positions they would occupy if placed in an actual plane normal to the patient's medial line of sight.

14. The method of determining the accuracy of the binocular judgment of depth comprising fixing the patient's eyes on a fixation object located substantially at the center of the field of vision, having the patient move a plurality of test objects about the fixation object as a center to positions wherein they appear to lie in a single plane normal to the medial line of sight and comparing the positions of said test objects with the positions they would occupy if placed in an actual plane normal to the patient's medial line of sight.

15. The method of determining the accuracy of and of correcting the binocular judgment of depth comprising fixing the patient's eyes on a fixation object located substantially at the center of the field of vision, having the patient move a plurality of test objects located to the right and to the left of the fixation object about said fixation object as a center to positions wherein they appear to him in a single plane normal to the principal line of sight, comparing the positions of said test objects with the positions they would occupy if placed in an actual plane normal to the patient's principal line of sight and putting corrective lenses of varying powers before the eyes until a correction is found wherein, when the test objects are moved to the positions where they appear to lie in said actual plane, they are actually placed in said plane.

16. The method of determining the differences in the size and shapes of the ocular images of the two eyes of a patient and of correcting said differences comprising fixing the patient's eyes on a fixation object located substantially at the center of the field of vision, presenting to the eyes a plurality of test objects at varying points in the periphery of the field of vision substantially equal distances to the right and to the left of said fixation object, moving said test objects toward and away from the patient until they appear to the eyes to lie in a single plane normal to his medial line of sight, comparing the positions of corresponding right and left targets with the positions they would occupy if placed in an actual plane normal to the patient's principal line of sight and putting corrective lenses of varying powers before the eyes until a correction is found wherein, when the test objects are moved to the positions where they appear to lie in said actual plane, they are actually placed in said plane.

17. A device of the character described comprising means placed in definite relation to the eyes of the patient for fixing said eyes, test means arranged for observation together with said fixation means and movable both horizontally and vertically about the fixation means as a center, and means for eliminating from the patient's vision all bases of depth judgment except that of binocular depth perception.

18. A device of the character described comprising means for fixing the eyes of the patient, test means mounted for pivotal movement horizontally about said fixation means, and means associated with said test means for eliminating from the patient's vision all bases of depth judgment except that of binocular depth perception.

19. A device of the character described comprising means for fixing the eyes of the patient, test means mounted for pivotal movement vertically about said fixation means, and means associated with said test means for eliminating from the patient's vision all bases of depth judgment except that of binocular depth perception.

20. A device of the character described comprising fixation means and test means both mounted for binocular observation, and means for moving said test means about said fixation means as center, in a predetermined path at varying distances from the eyes.

21. A device of the character described comprising means for fixing the eyes of a patient at a certain distance therefrom, test means mounted for binocular observation together with said fixation means, means for adjustment of said test means about said fixation means as center to varying distances relatively to the eyes, and means for excluding from said observation all bases of depth judgment except that of binocular depth perception.

22. The method of determining the differences in the size and shapes of the ocular images of the two eyes of a patient comprising fixing the patient's eyes on a central fixation object, presenting to the eyes test objects at various points distributed over the field of vision around said fixation object, adjusting said test objects toward and away from the eyes by rotating them about the fixation object until they appear to the patient to be in a single plane normal to his principal line of sight, comparing the positions of the test objects with the positions they would occupy if placed in an actual plane normal to the patient's principal line of sight and from the comparative data evaluating said size and shape differences.

23. The method of determining the differences in the size and shapes of the ocular images of the two eyes of a patient comprising fixing the patient's eyes on a fixation object located substantially at the center of the field of vision, presenting to the eyes a plurality of targets at various points in the periphery of the field of vision substantially equal distances to the right and to the left of said fixation object, moving said targets toward and away from the eyes by rotating them about the fixation object until they appear to the patient to lie in a single plane normal to his medial line of sight, and comparing the positions of corresponding right and left targets with the positions they would occupy if placed in an actual plane normal to the patient's principal line of sight.

24. The method of determining the differences in the size and shapes of the ocular images of the two eyes of a patient and of correcting said differences comprising fixing the patient's eyes on a fixation object located substantially at the center of the field of vision, presenting to the eyes a plurality of test objects at varying points in the periphery of the field of vision substantially equal distances to the right and to the left of said fixation object, moving said test objects toward and away from the eyes by rotating them about the fixation object until they appear to the patient to lie in a single plane normal to his medial line of sight, comparing the positions of corresponding right and left targets with the positions they would occupy if placed in an actual plane normal to the patient's principal line of sight and putting corrective lenses of varying powers before the eyes until a correction is found wherein, when the test objects are moved to the positions where they appear to lie in said actual plane, they are actually placed in such plane.

ADELBERT AMES, JR.